United States Patent
Chakrabarti et al.

(10) Patent No.: US 9,330,199 B2
(45) Date of Patent: May 3, 2016

(54) STRIPING OF DIRECTED GRAPHS AND NODES WITH IMPROVED FUNCTIONALITY

(71) Applicant: Facebook, Inc., Menlo Park, CA (US)

(72) Inventors: Deepayan Chakrabarti, Berkeley, CA (US); Jonathan Chang, San Francisco, CA (US); Avery Li Kuang Ching, Cupertino, CA (US); Maja Kabiljo, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/336,363

(22) Filed: Jul. 21, 2014

(65) Prior Publication Data

US 2016/0019313 A1 Jan. 21, 2016

(51) Int. Cl.
*G06F 9/46* (2006.01)
*G06F 17/30* (2006.01)
*H04L 12/911* (2013.01)
*H04L 29/06* (2006.01)
*H04L 12/26* (2006.01)

(52) U.S. Cl.
CPC .... *G06F 17/30958* (2013.01); *G06F 17/30412* (2013.01); *H04L 43/06* (2013.01); *H04L 47/70* (2013.01); *H04L 65/403* (2013.01)

(58) Field of Classification Search
USPC .............................................. 718/1, 100–106
IPC ....................... G06F 17/30958,17/30964, 17/79
See application file for complete search history.

(56) References Cited

U.S. PATENT DOCUMENTS

| | | | | |
|---|---|---|---|---|
| 6,240,549 B1 * | 5/2001 | Hamada | ............... | G06F 11/3664 714/E11.21 |
| 6,442,584 B1 * | 8/2002 | Kolli et al. | ..................... | 718/104 |
| 6,505,228 B1 * | 1/2003 | Schoening et al. | ........... | 718/106 |
| 6,629,123 B1 * | 9/2003 | Hunt | ..................... | G06F 9/5066 714/E11.209 |
| 7,325,232 B2 * | 1/2008 | Liem | ................... | G06F 17/5045 709/223 |
| 7,827,557 B2 * | 11/2010 | Zhu | ........................ | G06F 9/5005 370/238 |
| 7,870,556 B2 * | 1/2011 | Wholey, III | ........... | G06F 9/5066 709/226 |
| 8,041,421 B2 * | 10/2011 | Birchall | ................. | A61N 1/327 604/20 |
| 8,166,479 B2 * | 4/2012 | Roberts | ................. | G06F 9/5066 718/100 |
| 8,332,862 B2 * | 12/2012 | Isard | ...................... | G06F 8/433 709/201 |
| 8,560,605 B1 * | 10/2013 | Gyongyi | ....................... | 709/204 |
| 8,620,901 B2 * | 12/2013 | Jagota et al. | .................. | 707/716 |
| 8,631,414 B2 * | 1/2014 | Gargash | ................. | G06F 9/548 709/226 |
| 8,661,449 B2 * | 2/2014 | Rossbach et al. | ............. | 718/106 |

(Continued)

OTHER PUBLICATIONS

Burton et al, "Discovering Social Circles in Directed Graphs", ACM Transactions on Knowledge Discovery from Data, vol. 8, No. 4, Article 21, pp. 1-27, 2014.*

(Continued)

*Primary Examiner* — Anil Khatri
(74) *Attorney, Agent, or Firm* — Perkins Coie LLP (57) ABSTRACT

Embodiments are disclosed for striping a directed graph, e.g., a social graph, so as to efficiently perform an operation to each node in the directed graph. At least some of the embodiments can select first and second sets of nodes from the directed graph to form first and second stripes. The first and second sets of nodes are selected, for example, based on available computing resources. First and second intermediate results can be generated by performing the operation to each node of the first and the second stripes, respectively. The operation iteratively performs a superstep. The first and the second intermediate results are combined to form a collective result as an output of the superstep.

20 Claims, 5 Drawing Sheets

(56) References Cited

U.S. PATENT DOCUMENTS

| | | | |
|---|---|---|---|
| 8,736,612 B1* | 5/2014 | Goldman et al. | 345/440 |
| 8,875,145 B2* | 10/2014 | Atterbury | 717/140 |

OTHER PUBLICATIONS

Mohaisen et al, "On the Mixing Time of Directed Social Graphs and Security Implications", ACM, pp. 1-10, 2012.*

Kumar et al "Visualization of Clustered Directed Acyclic Graphs without Node Overlapping", IEEE, pp. 38-43, 2008.*

Libralao et al, "Node-Depth Encoding for Directed Graphs", IEEE, pp. 2196-2201, 2005.*

Ltoh et al, "A Hybrid Space-Filling and Force-Directed Layout Method for Visualizing Multiple-Category Graphs ", IEEE, pp. 121-128, 2009.*

Mo, "Prediction of Wheat Stripe Rust using Neural Network", IEEE, pp. 475-479, 2010.*

* cited by examiner

STRIPING OF DIRECTED GRAPHS AND NODES WITH IMPROVED FUNCTIONALITY

BACKGROUND

A directed graph ("digraph") is an abstract data structure that is often used by social networks to represent relationships between various entities, e. g., users or photographs, etc. A typical directed graph is constituted by more than one node and at least one edge (e.g., a line between nodes). By using a directed graph data structure, social networks can effectively identify relationships (e.g., represented by edges) among multiple social network users or other entities (e.g., represented by nodes).

Some analyses of social network data can require performing a specified action for a large set of the nodes in the directed graph. This analysis ("superstep") may consume a significant amount of computing resources, e.g., in cases with a large number of nodes. The supersteps may need to be repeated to generate meaningful data and so traditional techniques can quickly run out of all available computing resources.

During peak hours (e.g., with high network traffic), high demands of computing resources caused by these analyses can result in system failures, malfunctions, and/or suspension of online services.

BRIEF DESCRIPTION OF THE DRAWINGS

Embodiments disclosed herein may be better understood by referring to the following Detailed Description in conjunction with the accompanying drawings, in which like reference numerals indicate identical or functionally similar elements.

DETAILED DESCRIPTION

Embodiments are disclosed for "striping" a directed graph so as to perform some operations (e.g., analyses of social network data) efficiently. Some analysis operations in a social network may perform a specified action for each node (or many nodes) in a directed graph (the analysis operation can be referred to herein as a "superstep"). In a directed graph, edges (e.g., lines between nodes) can be directional (e.g., Edge AB can represent an operation/action from Node A to Node B, while Edge BA can represent an operation/action from Node B to Node A). The disclosed embodiments can divide the directed graph into multiple stripes or groups, and then perform the superstep for each node in a stripe to generate an intermediate result. Stripe by stripe, nodes in other stripes can be processed to generate other intermediate results. The generated intermediate results are then combined as an overall output for the entire operation. In various embodiments, the output can be used to update a value of the directed graph (e.g., as an initial value for a next round of the superstep) and then the superstep can be repeatedly performed until a specified goal is met.

An example of an operation that employs a relatively large amount of computing resources is an operation for identifying "mutual friends" in social networks. Identifying mutual friends of two social network users (e.g., represented by two nodes) can involve sending messages to check relationships between nodes from one social network user (e.g., a node) to other connected users (e.g., other nodes) in the social network. This process may be performed iteratively for other social network users. When a large number of nodes are involved, the whole process can be extremely time-consuming and require a large amount of computing resources (e.g., memories to store information relating to all nodes).

A "striping" process discussed in the disclosed embodiments can be defined as, for example, dividing multiple nodes of a directed graph into multiple groups so that a superstep can be performed for at least some of the groups. Advantages of the striping process include providing flexibility of the operation and improving efficiency. The striping process can enhance flexibility by allowing computer devices with limited computing resources to perform tasks that would otherwise require much more computing resources. For example, a superstep for the directed graph may involve accessing/processing 1,000 terabytes of data. Assuming that the striping process divides the directed graph into 500 stripes and that each stripe consumes a substantially-similar amount of computing resources, then performing the superstep for each stripe only involves accessing/processing 2 terabytes of data. Therefore, by striping, it becomes possible for computing devices with fewer computing resources to perform a superstep.

Further, the striping process can enhance efficiency by enabling multiple computing devices to perform supersteps in parallel. For example, performing a superstep for the directed graph may take about 5,000 hours by a single computing device (e.g., the single computing device may have a large amount of memory to store all data to be processed, but it only has limited numbers of processors. Assuming that the striping process divides the directed graph into 500 stripes, then the superstep can be performed by 500 computing devices in parallel in about 10 hours. Therefore, by striping, it becomes possible to perform a superstep in a faster fashion.

When striping a directed graph, factors to be considered include, for example, availability of computing resources, locality of data storage devices, the number of nodes/edges, types of applications to be performed (e.g., how many variants needed to be considered), types of actions to be performed for each node (e.g., sending or receiving a message), various graph data structures, overall system efficiency, and/or other suitable factors. In various embodiments, the disclosed embodiments can include a verification component (or, a "boundary" or "barrier" component) that can be used to verify whether an overall process for all nodes in a directed graph has been completed properly.

In the foregoing and following descriptions, although directed graphs may be used for convenience of description, it is to be understood that other graph data structure can also be employed. Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Figure 1:
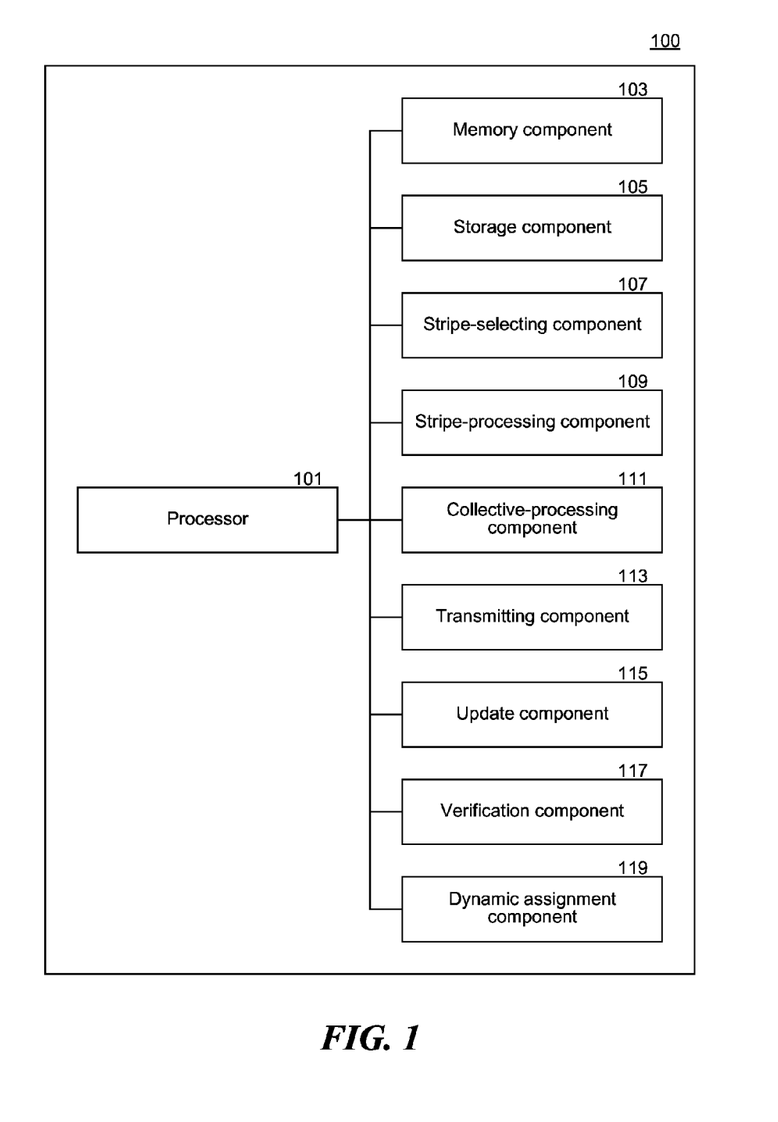
FIG. 1 is a block diagram illustrating a system in accordance with various embodiments of the present disclosure.

FIG. 1 is a block diagram illustrating a system 100 in accordance with various embodiments of the present disclosure. The system can perform a specified action for each node in a directed graph. As shown in FIG. 1, the system 100 can include a processor 101, a memory component 103, a storage component 105, a stripe-selecting component 107, a stripe-processing component 109, a collective-processing component 111, a transmitting component 113, an update component 115, a verification component 117, and a dynamic assignment component 119. The processor 101 is coupled to other components and configured to control the same in the system 100. The memory component 102 is configured to temporarily store data to be processed and/or intermediate results during operation. The storage component 105 is configured to store data to be processed, intermediate results, overall results, system outputs, or other suitable information. In various embodiments, the storage component can be a distributed storage system. In various embodiments, the storage component can be a single storage device with multiple virtual partitions.

In the illustrated embodiment, the stripe-selecting component 107 is configured to divide nodes in the directed graph into multiple groups so as to form multiple corresponding stripes. Each stripe can have a set of nodes and a set of edges (e.g., lines) connecting the set of nodes. In various embodiments, each stripe can have a substantially the same number of nodes. In various embodiments, each stripe can consume a substantially-the-same amount of computing resources. Computing resources can be estimated based on various factors such as, network bandwidths, processor capacities, storage spaces, and other suitable factors. In various embodiments, nodes in a same stripe can be stored in a same physical location (e.g., at a same network hard drive). In various embodiments, nodes in a same stripe can be stored in a same virtual partition (e.g., a horizontal shard of a database). In various embodiments, stripes can be selected based on following factors: availability of computing resources, types of applications to be performed (e.g., how many variants needed to be considered), types of actions to be performed for each node (e.g., sending or receiving a message), various graph data structures, overall system efficiency, and/or other suitable factors.

In the illustrated embodiment, the stripe-processing component 109 is configured to perform a specified action (e.g., a routine/instruction for sending/receiving messages, a request for data retrieval, an inquiry, and/or signal transmitting) for each node in an assigned stripe so as to generated intermediate results. The collective-processing component 111 is configured to generate a collective result at least based on the generated intermediate results. In various embodiments, for example, the specified action can be "sending a friend list of a social network user (e.g., represented as a node in the directed graph) to other predefined social network users (e.g., those who use a same application, e.g., an online game)." Assuming that there are three stripes (Stripes A, B, and C) in the directed graph, the stripe-processing component 109 can be configured to send friend lists (e.g., to every other nodes in the directed graph, not just nodes in Stripe A) for each node in Stripe A. After sending these friend lists, a corresponding intermediate result A can be generated and (temporarily) stored. By repeating similar steps for nodes in Stripes B and C, intermediate results B and C can be subsequently generated and (temporarily) stored. After completion of performing the specified actions for Stripes A, B, and C, the collective-processing component 111 can then collect intermediate results A, B, and C and form a collective result.

In the illustrated embodiment, the verification component 117 can verify or check the validity of the collective result. The verification component 117 can approve the current collective result, request another round of above-mentioned process (e.g., all specified actions for Stripes A, B, and C, or collectively a superstep), or generate a report to an administrator, e.g., of an abnormal event. After approval, the collective result can be transmitted as an output (of the superstep) for further processing by the transmitting component 113.

In various embodiments, the output can be used to update a current value of the directed graph by the update component 115. After the update, the above-mentioned process (e.g., the superstep) can be repeatedly performed until a predetermined goal is met. Examples of the predetermined goal can include completion of certain calculation, receipt of certain outputs, and/or other suitable criteria. The predetermined goal can be predefined by system administrators or application developers, and it may vary depending on different applications.

In various embodiments, the dynamic assignment component 119 can perform an optimization process by dynamically moving (or reassigning) assigned nodes among stripes between two supersteps. For example, a system administrator can periodically monitor the computing resources that are actually consumed by each stripe and then determine whether the optimizing step is warranted. In various embodiments, the dynamic assignment component 119 can monitor the status of the system 100 and accordingly move a certain percentage (e.g., 1-30%) of nodes from one stripe to another stripe. In other embodiments, the dynamic assignment component 119 can move a certain number of nodes from one stripe to another stripe.

Figure 2:
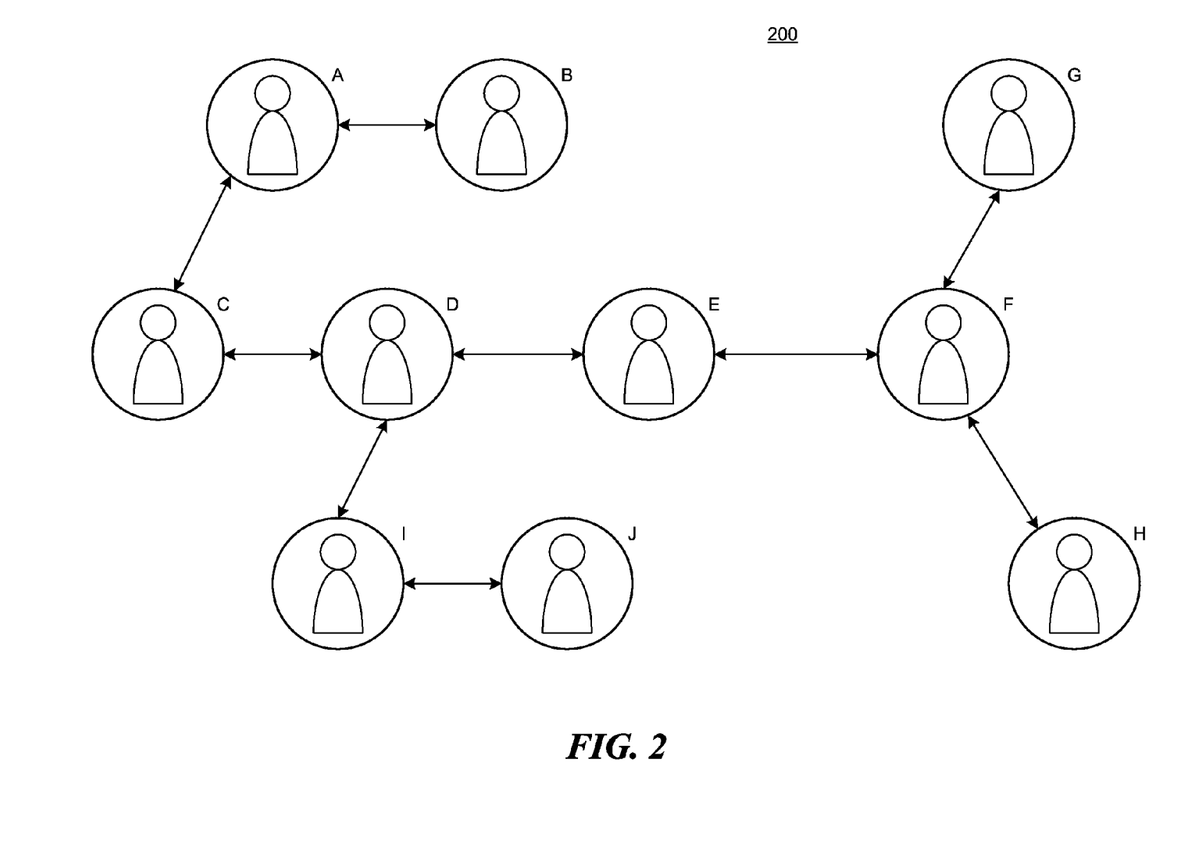
FIG. 2 is a schematic diagram illustrating a social directed graph in accordance with various embodiments of the present disclosure.

FIG. 2 is a schematic diagram illustrating a social directed graph 200 in accordance with various embodiments of the present disclosure. As shown in FIG. 2, the social directed graph 200 includes 10 social network users A, B, C, D, E, F, G, H, I, and J, represented by nodes A, B, C, D, E, F, G, H, I, and J. Relationships among social network users A to J are denoted by lines (i.e., edges) between two nodes (not all relationships are shown in FIG. 2). For example, line AC (or direction vectors AC and CA) represents relationships (e. g., social network user A follows social network user C or social network user C tags social network user A as a close friend in a picture) between social network users A and C.

Figure 3:
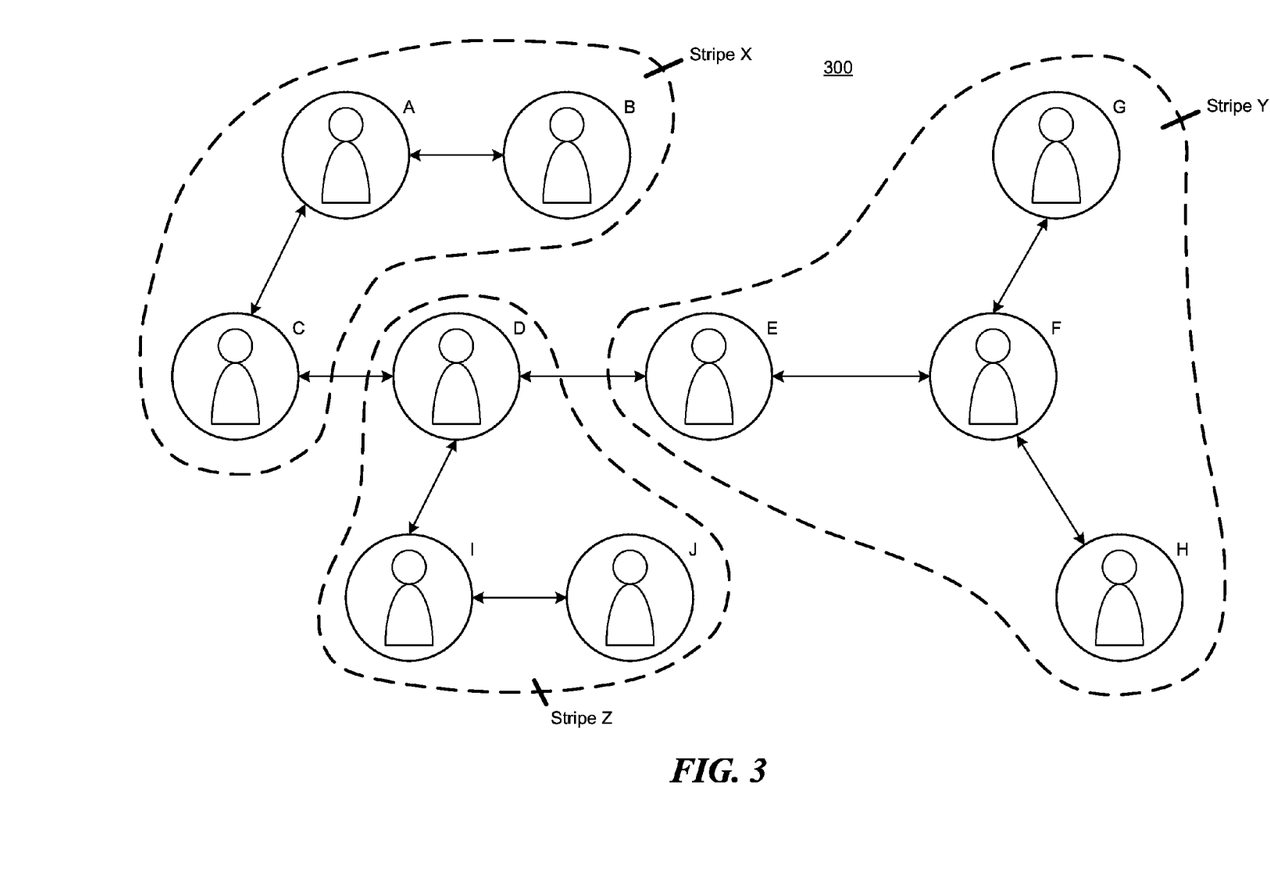
FIG. 3 is a schematic diagram illustrating exemplary stripes of the social directed graph of FIG. 2 in accordance with various embodiments of the present disclosure.

FIG. 3 is a schematic diagram illustrating exemplary stripes of the social directed graph 200 of FIG. 2 in accordance with various embodiments of the present disclosure. In the illustrated embodiment, the social directed graph 200 can be divided into 3 groups, namely Stripes X, Y, and Z. Stripe X includes nodes A, B, and C. Stripe Y includes nodes E, F, G, and H. Stripe Z includes nodes D, I, and J. As discussed above, factors to be considered when striping the social directed graph include, for example, numbers of nodes in each stripe (e.g., if each node consumes a similar amount of computing resources, then each stripe can have a similar number of nodes), consumption of computing resources (e.g., each stripe can consume a similar amount of computing resources), physical or virtual locations of data storage (e.g., nodes stored in a same physical or virtual partition are selected into a same stripe), availability of computing resources, types of applications to be performed (e.g., how many variants needed to be considered), types of actions to be performed for each node (e.g., sending or receiving a message), various graph data structures, overall system efficiency, and/or other suitable factors.

In some embodiments, the difference among the numbers of nodes in each stripe can be within (or does not exceed) a predetermined threshold value of nodes. For example, the social directed graph 200 can have 500 nodes, and the predetermined threshold value can be 20 nodes. The social directed graph 200 can be divided into three stripes, Stripes X, Y and Z. Stripe X can include 160 nodes, Stripe Y can include 165 nodes, and Stripe Z can include 175 nodes. By this arrangement, the maximum difference between the numbers of nodes from different stripes is 15 nodes (Stripe X and Stripe Z), which is within the predetermined threshold value (20 nodes).

In some embodiments, the difference among the amounts of computing resources consumed by each stripe can be within (or does not exceed) a predetermined threshold value of computing resources. For example, the social directed graph 200 can have 500 nodes (Nodes 1-500) and the predetermined threshold value is 30 units of computing resources. The social directed graph 200 can be divided into three stripes, Stripes X, Y and Z. Stripe X can include Nodes 1-100, Stripe Y can include Nodes 101-300, and Stripe Z can include Nodes 301-500. Each of Nodes 1-100 can consume 2 units of computing resources, each of Nodes 101-300 can consume 1.1 units of computing resources, and each of Nodes 301-500 can consume 1.15 units of computing resources. By this arrangement, the maximum difference between the computing resources consumed by different stripes is 30 units (between Stripe X and Stripe Z—Stripe X consumes 200 units (100 nodes multiply 2 units) and Stripe Z consumes 230 units (200 nodes multiply 1.15 units), which is within the predetermined threshold value (30 units of computing resources).

Figure 4:
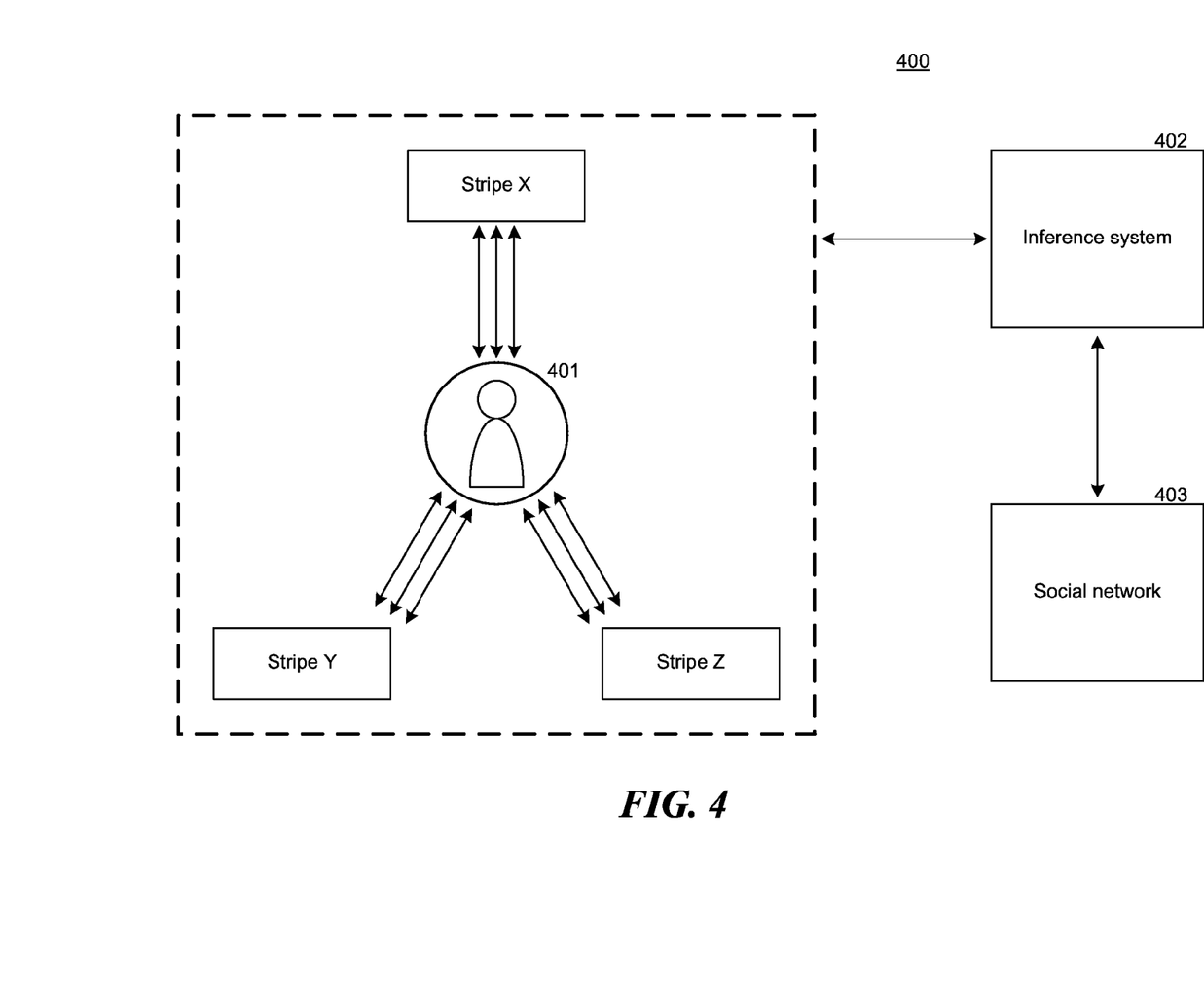
FIG. 4 is schematic diagram illustrating exemplary stripes of a directed graph in accordance with various embodiments of the present disclosure.

FIG. 4 is schematic diagram illustrating exemplary stripes of a directed graph 400 in accordance with various embodiments of the present disclosure. As shown in FIG. 4, the directed graph 400 can include a focal node 401 (e.g., a focal social network user), Stripes X, Y, and Z connected with the focal node 401. Stripes X, Y, and Z respectively include multiple nodes (not shown; e.g., other social network users) and corresponding lines (not shown; e.g., corresponding relationships) therein. The directed graph 400 can be accessed by an inference system 402, which can iteratively infer information in the directed graph 400 (e.g., social connection explanations, relationships, attribute labels, and/or computed likelihood scores) to a social network 403 for the focal node 401. When the social network 403 has a large number of nodes, an overall inference process for multiple nodes without striping can take a long time. Therefore, the striping of the directed graph 400 can advantageously improve the efficiency of the overall inference process.

Figure 5:
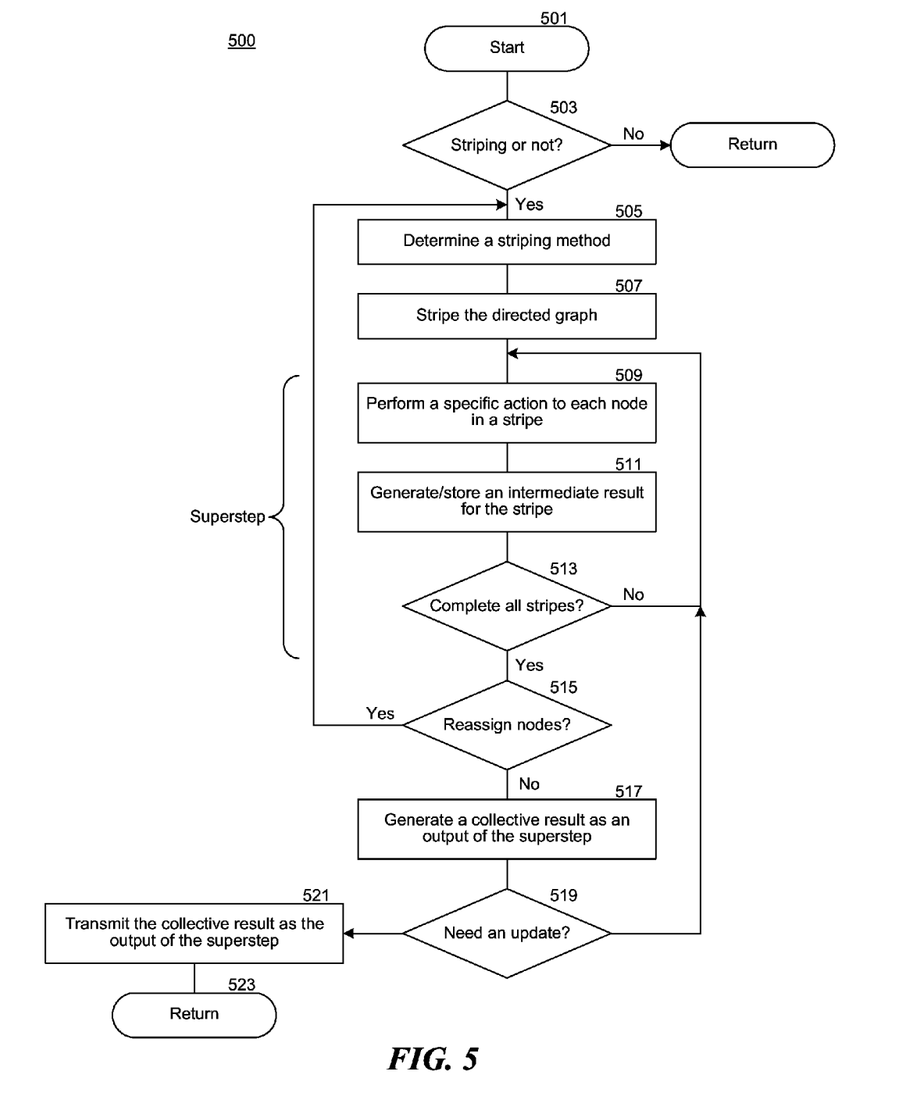
FIG. 5 is a flow diagram illustrating a routine for implementing a method for striping a directed graph in accordance with various embodiments of the present disclosure.

FIG. 5 is a flow diagram illustrating a routine 500 for implementing a method for striping a directed graph in accordance with various embodiments of the present disclosure. The directed graph includes multiple nodes and edges connecting the nodes. The routine 500 begins at block 501. At block 503, the routine 500 determines whether a striping process is necessary (e.g., available computing resources cannot perform a superstep without striping) or recommended (e.g., available computing resources can perform a superstep but striping can provide a better result) to perform a superstep in the directed graph. The superstep performs a specific action for each node (or many nodes) in the directed graph. Examples of the specific action can include sending/receiving messages, an inquiry, a request for data retrieval, and/or signal transmitting. In various embodiments, the routine 500 can determine whether to stripe the directed graph at least based on types of supersteps to be performed, data amounts to be processed, and/or currently available computing resources.

After deciding to stripe the direct graph, the routine 500 then proceeds to block 505 to determine a striping method. In various embodiments, the striping method can be determined based on various factors, such as availability of computing resources, locality of data storage devices, the number of nodes/edges, types of applications to be performed (e.g., how many variants needed to be considered), types of actions to be performed for each node (e.g., sending or receiving a message), various graph data structures, and/or overall system efficiency.

In various embodiments, the striping method can be determined based on an order of sending messages (e.g., from nodes in a directed graph) and/or receiving messages (e.g., at nodes in the directed graph). For example, the directed graph can include 300,000 nodes. In a superstep of sending a message to other nodes, for example, the nodes will send message to the other nodes one by one (i.e., the order of sending messages). Specifically, node 1 can send messages to nodes 2 to 300,000 first, then node 2 can send messages to node 1 and 3-300,000 then node 3 can send messages to node 1, 2, and 4-300,000, and so on. For example, the nodes can be divided into three stripes, Stripes A, B, and C, based on the order of sending messages. For example, Stripe A can include nodes 1-100,000 (e.g., those sending messages first), Stripe B can include nodes 100,001-200,000 (e.g., those sending messages later), and Stripe C can include nodes 200,001-300,000 (e.g., those sending messages last).

Similarly, for example, in a superstep of receiving a message from other nodes, the nodes can receive message from the other nodes one by one (i.e., the order of receiving messages). Assuming that the directed graph includes 600,000 nodes, node 1 can receive messages from nodes 2 to 600,000 first, then node 2 can receive messages from node 1 and 3-600,000, then node 3 can receive messages from node 1, 2, and 4-600,000, and so on. For example, the nodes can be divided into four stripes, Stripes A, B, C, and D, based on the order of receiving messages. For example, Stripe A can include nodes 1-150,000, Stripe B can include nodes 150, 001-300,000, Stripe C can include nodes 300,001-450,000, and Stripe D can include nodes 450,001-600,000.

In various embodiments, the striping method can include assigning a substantially the same number of nodes to each stripe. Assuming that the directed graph includes 500,000 nodes, for example, then the directed graph can be striped into five stripes and each has 100,000 nodes. In various embodiments, the striping method can include assigning approximate nodes into a same stripe. Approximate nodes can include those stored in a same physical storage device or those stored in a same virtual storage partition. For example, nodes stored in a same horizontal shard of a database can be striped into a same stripe. In another example, nodes stored in a same network hard drive can be striped into a same stripe.

After the striping method is determined, the routine 500 proceeds to block 507 to stripe the directed graph based on the determined striping method. At block 509, the routine 500 can perform a specific action (e.g., sending/receiving messages, an inquiry, a request for data retrieval, and/or signal transmitting) to each node in a stripe. At block 511, the routine 500 can then generate and store an intermediate result for the stripe based on the performed specific action. In various embodiments, the intermediate results can be generated based on a predetermined formula (e.g., calculating likelihood scores retrieved from a stripe). At block 513, the routine 500 checks whether the specific action has been performed for all stripes (i.e., whether a superstep has been completed). If not, then the routine 500 can go back to block 509 to further process a next stripe. If so, then the routine 500 proceeds to block 515.

At block 515, the routine 500 can determine whether an optimizing step of reassigning nodes among stripes is warranted. In various embodiments, the routine 500 can monitor the computing resources that are actually consumed by each stripe and then determine whether the optimizing step is warranted. In various embodiments, the routine 500 can move a certain percentage (e.g., 1-30%) of nodes from one stripe to another stripe. In other embodiments, the routine 500 can move a certain number of nodes from one stripe to another stripe. At block 517, the routine 500 generates a collective result as an output of the superstep based on the intermediate results. In various embodiments, the collective result can be generated by a linear combination of the intermediate results.

At block 519, the routine 500 can update a value of the directed graph (e.g., as an initial value for the next round of the superstep) based on the output of the superstep. Based on the updated value of the directed graph, the routine 500 can repeatedly generate the output of the superstep until a predetermined goal is met (e.g., completion of certain calculation, receipt of certain outputs, and/or other suitable criteria). At block 521, the routine 500 transmits the collective result as an output of the superstep. The routine 500 can then return at block 523. In some embodiments, the routine 500 can verify the output of the superstep by a verification program. The verification program (e.g., a boundary program) can be used to verify whether an overall process for all nodes (e.g., a superstep) in a directed graph has been completed properly.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the present disclosure is not limited except as by the appended claims.

I/we claim:

1. A method for striping a directed graph, comprising:
   selecting a first set of nodes from the directed graph to organize a first stripe, wherein the first stripe includes a first set of edges to connect the first set of nodes;
   selecting a second set of nodes from the directed graph to organize a second stripe, wherein the second stripe includes a second set of edges to connect the second set of nodes, wherein the first and second sets of nodes are selected at least based on computing resources allocated to perform an operation on at least a portion of the directed graph, the operation iteratively performing a superstep, wherein the superstep performs the operation for each node of the directed graph in the stripes;
   generating a first intermediate result by performing the operation for each node of the first set of nodes, wherein the operation causes an interaction between multiple nodes of the first set of nodes, wherein generating the first intermediate result consumes a first amount of computing resources;
   storing the first intermediate result;
   generating a second intermediate result by performing the operation for each node of the second set of nodes, wherein generating the second intermediate result consumes a second amount of computing resources;
   storing the second intermediate result;
   generating a collective result at least based on the first intermediate result and the second intermediate result; and
   transmitting the collective result as an output of the superstep;
   updating a value of the directed graph based on the output of the superstep.

2. The method of claim 1, further comprising:
   based on the updated value of the directed graph, repeatedly generating the output of the superstep until a predetermined goal is met.

3. The method of claim 1, further comprising verifying the output of the superstep by a verification program.

4. The method of claim 1, wherein the first set of nodes is selected at least based on an order of sending messages from the nodes of the directed graph.

5. The method of claim 1, wherein the second set of nodes is selected at least based on an order of receiving messages at the nodes of the directed graph.

6. The method of claim 1, wherein the difference between the first amount and the second amount is within a predetermined threshold value.

7. The method of claim 1, wherein the difference between the number of the first set of nodes and the number of the second set of nodes is within a predetermined threshold value.

8. The method of claim 1, further comprising dynamically reassigning at least one of the first set of nodes to the second stripe.

9. The method of claim 1, wherein the first set of nodes is located at a first shard of a database, and wherein the second set of nodes is located at a second shard of the database.

10. A computer-readable storage medium storing instructions for striping a directed graph, comprising:
    instructions for selecting a first set of nodes from the directed graph to organize a first stripe, wherein the first stripe includes one or more first edges to connect the first set of nodes, and wherein the first set of nodes is stored at a first data storage; instructions for selecting a second set of nodes from the directed graph to organize a second stripe, wherein the second stripe includes one or more second edges to connect the second set of nodes, and wherein the second set of nodes is stored at a second data storage;
    instructions for generating a first intermediate result by performing an operation for each node of the first set of nodes, wherein the operation causes an interaction between multiple nodes, and wherein the operation iteratively performing a superstep, wherein the superstep performs the operation for each node of the directed graph in the stripes, wherein generating the first intermediate result consumes a first amount of computing resources;
    instructions for storing the first intermediate result; instructions for generating a second intermediate result by performing the operation for each node of the second set of nodes, wherein generating the second intermediate result consumes a second amount of computing resources; instructions for storing the second intermediate result;
    instructions for generating a collective result at least based on the first intermediate result and the second intermediate result; and instructions for transmitting the collective result as an output of the superstep;
    instructions for updating a value of the directed graph based on the output of the superstep.

11. The computer-readable storage medium of claim 10, further comprising:

instructions for repeatedly generating the output of the superstep until a predetermined goal is met based on the updated value of the directed graph.

12. The computer-readable storage medium of claim 10, further comprising verifying the output of the superstep by a verification program.

13. The computer-readable storage medium of claim 10, wherein the first set of nodes is selected at least based on an order of sending messages from the nodes of the directed graph.

14. The computer-readable storage medium of claim 10, wherein the second set of nodes is selected at least based on an order of receiving messages at the nodes of the directed graph.

15. The computer-readable storage medium of claim 10, wherein the difference between the first amount and the second amount is within a predetermined threshold value.

16. The computer-readable storage medium of claim 10, further comprising dynamically reassigning at least one of the first set of nodes to the second stripe.

17. A system of performing an operation for each of multiple nodes in a directed graph, the system comprising:

a processor;

a memory component coupled to the processor;

a storage component coupled to the processor, wherein the storage component stores the multiple nodes of the directed graph;

a stripe-selecting component configured to select a first set of nodes from the directed graph to organize a first stripe and to select a second set of nodes from the directed graph to organize a second stripe, wherein the first set of nodes and the second set of nodes are selected at least based on a computing capacity of the memory;

a stripe-processing component configured to perform the operation for each node of the first set of nodes to generate a first intermediate result and to perform the operation for each node of the second set of nodes to generate a second intermediate result, wherein the operation causes an interaction between multiple nodes, wherein the first intermediate result is generated by consuming a first amount of computing resources, and wherein the second intermediate result is generated by consuming a second amount of computing resources, and wherein the first intermediate result and the second intermediate result are stored in the storage component;

a collective-processing component configured to generate a collective result at least based on the first intermediate result and the second intermediate result; and a transmitting component configured to transmit the collective result as an output;

an update component configured to update a value of the directed graph based on the output.

18. The system of claim 17, further comprising:

wherein the output is repeatedly updated based on the updated value of the directed graph until a predetermined goal is met.

19. The system of claim 17, further comprising a verification component configured to verify the output.

20. The system of claim 17, further comprising a dynamic assignment component configured to reassign at least one of the first set of nodes to the second stripe.

* * * * *